(12) United States Patent
Akatsu

(10) Patent No.: US 6,879,125 B2
(45) Date of Patent: Apr. 12, 2005

(54) CONTROL APPARATUS AND METHOD FOR AT LEAST ONE ELECTRICAL ROTATING MACHINE USING COMPOUND CURRENT

(75) Inventor: Kan Akatsu, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/400,509

(22) Filed: Mar. 28, 2003

(65) Prior Publication Data

US 2003/0184243 A1 Oct. 2, 2003

(30) Foreign Application Priority Data

Apr. 1, 2002 (JP) ........................................ 2002-098149

(51) Int. Cl.[7] ............................................... B06L 11/12
(52) U.S. Cl. ...................... 318/495; 318/154; 318/494; 310/112; 310/113
(58) Field of Search ............................ 318/41, 138, 139, 318/254, 268; 310/112, 114, 180, 184

(56) References Cited

U.S. PATENT DOCUMENTS

| | | | |
|---|---|---|---|
| 6,049,152 A | | 4/2000 | Nakano |
| 6,429,562 B2 | * | 8/2002 | Nakano et al. ............ 310/113 |
| 2001/0020805 A1 | * | 9/2001 | Nakano et al. ............ 310/112 |
| 2003/0062784 A1 | * | 4/2003 | Arimitsu et al. ............ 310/112 |
| 2003/0132724 A1 | * | 7/2003 | Arimitsu ...................... 318/41 |
| 2003/0155876 A1 | * | 8/2003 | Arimitsu .................... 318/254 |
| 2003/0184245 A1 | * | 10/2003 | Arimitsu .................... 318/268 |
| 2003/0193253 A1 | * | 10/2003 | Arimitsu et al. ............ 310/114 |

FOREIGN PATENT DOCUMENTS

| | | |
|---|---|---|
| EP | 1 087 518 A2 | 3/2001 |
| EP | 1 180 446 A2 | 2/2002 |
| JP | 63018990 | 1/1998 |
| JP | 11-275826 * | 10/1999 |
| JP | 11-275827 * | 10/1999 |
| JP | 11-275828 * | 10/1999 |
| JP | 11-356015 A | 12/1999 |
| JP | 2000217316 | 8/2000 |
| JP | 2001-231227 * | 8/2001 |
| JP | 2001-231227 A | 8/2001 |
| JP | 2001-275320 * | 10/2001 |
| JP | 2001-275396 * | 10/2001 |

OTHER PUBLICATIONS

U.S. Appl. No. 10/337,898, filed Jan. 8, 2003, Arimitsu.
U.S. Appl. No. 10/361,559, filed Feb. 11, 2003, Arimitsu.
Patent Abstracts of Japan, vol. 2000, No. 03, Mar. 30, 2000, JP 11–356100, Dec. 24, 1999.
Patent Abstracts of Japan, vol. 2000, No. 03, Mar. 30, 2000, JP 11–356099, Dec. 24, 1999.

* cited by examiner

*Primary Examiner*—Paul Ip
(74) *Attorney, Agent, or Firm*—Foley & Lardner LLP

(57) ABSTRACT

In control apparatus and method for at least one electrical rotating machine, two rotors are disposed in the electrical rotating machine on the same axis of rotation and being driven independently of each other by means of a generated compound current and are associated with at least one stator and a position of at least one of the rotors is controlled in such a manner that a maximum value of the compound current is reduced as low as possible.

19 Claims, 14 Drawing Sheets

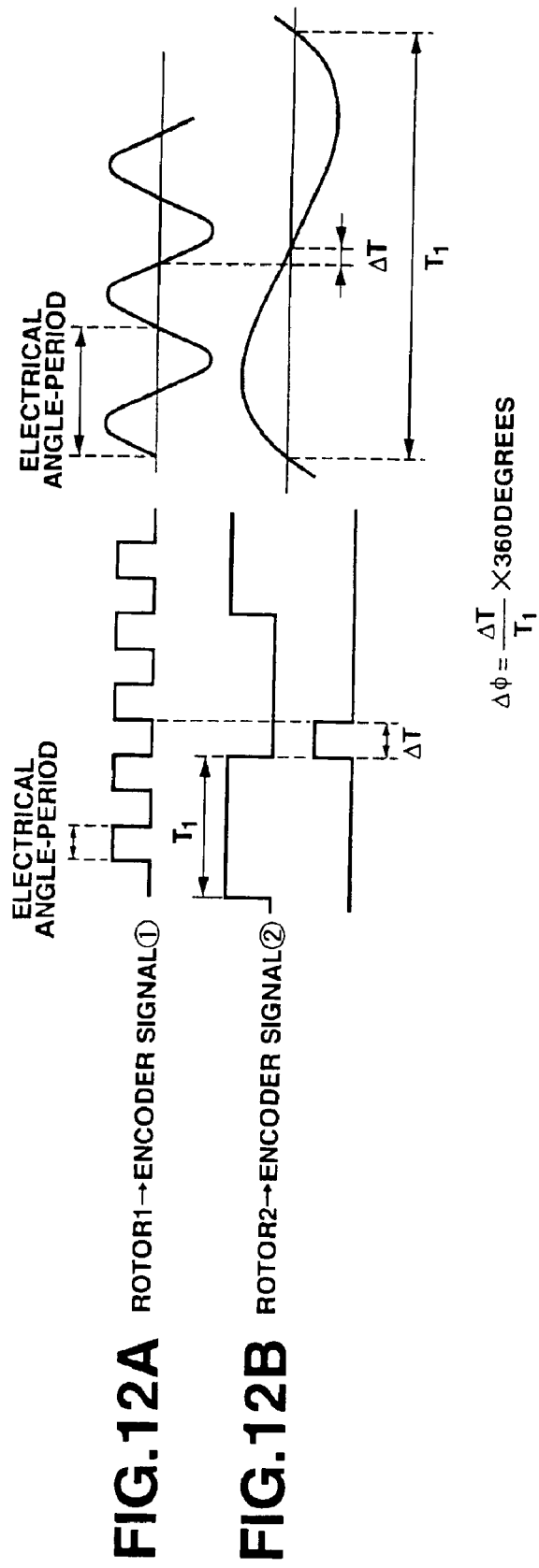

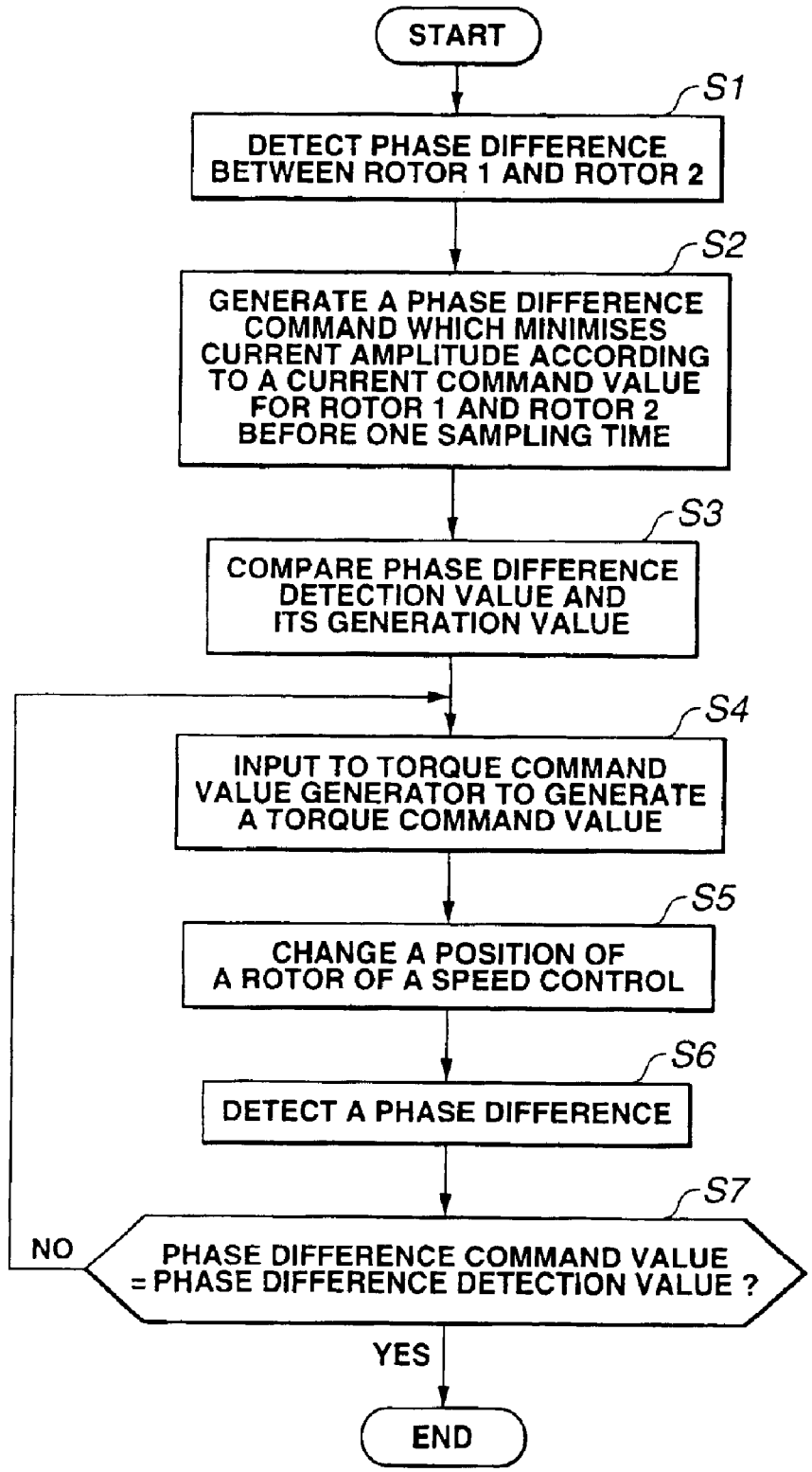

CONTROL APPARATUS AND METHOD FOR AT LEAST ONE ELECTRICAL ROTATING MACHINE USING COMPOUND CURRENT

BACKGROUND OF THE INVENTION

1. Field of the Invention

The present invention relates generally to control apparatus and method for at least one electrical rotating machine using a compound current. The present invention, more particularly, relates to control apparatus and method for an electrical rotating machine having two rotors disposed in the electrical rotating machine on the same axis of rotation and driven independently of each other by means of a compound current and commonly associated with a single stator or a pair of electrical rotating machines, each electrical rotating machine being provided with one of the two rotors, each rotor being independently driven by means of the compound current.

2. Description of the Related Art

Recently, a hybrid vehicle in which an internal combustion engine and an electric motor (or electric motors) have been used as driving sources or an electric vehicle in which only the electric motor has been used have been put into practice. In such a hybrid vehicle or electric vehicle as described above, two separate motors of a running power motor and a power generating motor are mounted in the vehicle. However, mounting the two motors in the vehicle produces problems of a spacing, a weight, a heat generation countermeasure, and a manufacturing cost. That is to say, a provision of the two motors bring these problems two times severer. Therefore, as a motor suitable for the hybrid vehicle and electric vehicle, a single multi-phase motor which is capable of outputting a power into two systems and which is capable of being controlled individually and separately has been proposed. In details, such an electrical rotating machine as constituted by two rotors installed on the same axis of rotation, commonly associated with a single stator, and driven independently of each other by means of a compound current has been proposed. Or, a pair of electrical rotating machines have been proposed in which, although the number of motors are two, each rotor is driven independently by means of the compound current and each electrical rotating machine is provided with a corresponding stator, as a system capable of commonly using parts except the motors. A Japanese Patent Application First Publication No. Heisei 11-356015 published on Dec. 24, 1999 discloses a previously proposed control apparatus for such an electrical rotating machine as described above using the compound current.

SUMMARY OF THE INVENTION

In the previously proposed control apparatus for the electrical rotating machine disclosed in the above-identified Japanese Patent Application First Publication, a simple sum of respective alternating currents to be caused to flow into respective rotors (namely, to be supplied to the stator coil to act independently on each rotor) is used as the compound current. At this time, without consideration of a phase difference between compound current components in the compound current, a sum of each amplitude of original currents (compound current components for the respective rotors) can be a maximum amplitude value of the compound current. For example, in a case where a current (component) for the first rotor has an amplitude of 100 A (Amperes) and another current (component) for the second rotor has an amplitude of 50 A, these two currents are simply added to achieve the compound current having a maximum amplitude of 150 A. However, the maximum amplitude value of the compound current is varied in accordance with the phase difference between each current to be caused to flow into the stator coil for each rotor. Since, in the previously proposed control for the electrical rotating machine, no consideration for the phase of each current is given, it is necessary to determine a rated current of a subsequent stage device (for example, an inverter etc.) through which the compound current is caused to flow supposing that the maximum value of the compound current reaches to the sum of the maximum values of each current depending upon the phase difference.

FIG. 1 shows a graph representing a compound current waveform in a case where the phase difference between each original current is 45 degrees. The compound current shown in FIG. 1 is a sum of a first current (AC) for the first rotor having an amplitude of 100A and a frequency of 50 Hz and a second current (AC) for the second rotor having an amplitude of 100A and a frequency of 100 Hz. FIG. 2 shows a graph representing the compound current waveform in a case where the phase difference between each original current is 90 degrees. The compound current is the sum of the first current having the amplitude of 100A and the frequency of 50 Hz and the second current having the amplitude of 100A and the frequency of 100 Hz. That is to say, although the same compound current (each amplitude is the same and each frequency is the same) is resulted in both of FIGS. 1 and 2, only the phase difference is different from each other of the cases of FIGS. 1 and 2. It is appreciated that a maximum value of the amplitude is 200A when the phase difference is 45 degrees (FIG. 1) and the maximum value thereof is 170A when the phase difference is 90 degrees. In this way, the current maximum value is varied according to the phase difference. FIG. 3 shows a graph representing a compound current amplitude maximum value phase-difference dependent characteristic. It is noted that the compound current shown in each of FIGS. 1 and 2 was used and only the phase difference was varied to obtain the amplitude maximum value. It will be appreciated from FIG. 3 that the current maximum value is varied from 200 A (the phase difference is approximately 45 degrees) to about 175A (phase difference is approximately 90 degrees). That is to say, it is possible to suppress the maximum current value to be lower by controlling the phase difference between each original current utilizing this phenomenon while exhibiting the same motor outputs. Under this condition, it will be appreciated from FIG. 3 that, if the phase difference is controlled to be a multiple of 90 degrees, the maximum current value can be suppressed to be minimized. It is noted that the term of low is derived from a height of the current waveform and has the same meaning as small from a viewpoint of a current value.

It is, hence, an object of the present invention to provide control apparatus and method for at least one electrical rotating machine which control the phase difference between each original current constituting the compound current for the corresponding one of the rotors of the electrical rotating machine so as to suppress the maximum value of the compound current to a lower (or smaller) value (preferably, equal to or lower than an average value of the current values when the phase difference is varied and, more preferably, to a minimum value), thus achieving an effective use of a device (the electrical rotating machine or the pair of electrical rotating machines) into which the compound current is caused to flow and achieving a reduction of the compound current.

According to one aspect of the present invention, there is provided with a control apparatus for at least one electrical rotating machine, comprising: two rotors disposed in the electrical rotating machine on the same axis of rotation and being driven independently of each other by means of a generated compound current and commonly associated with at least one stator; and a controlling section that controls a position of at least one of the rotors in such a manner that a maximum value of the compound current is suppressed to be reduced as low as possible.

According to another aspect of the present invention, there is provided with a control method for at least one electrical rotating machine, the electrical rotating machine comprising: two rotors disposed in the electrical rotating machine on the same axis of rotation; and at least one stator commonly associated with the respective rotors, the control method comprising: generating a compound current by means of which the respective rotors are driven independently of each other; and controlling a position of at least one of the rotors in such a manner that a maximum value of the compound current is suppressed to be reduced as low as possible.

This summary of the invention does not necessarily describe all necessary features so that the invention may also be a sub-combination of these described features.

BRIEF DESCRIPTION OF THE DRAWINGS

FIGS. 12A and 12B are model views of encoder signals for explaining a principle of operation of a phase difference detector 120 shown in FIG. 7.

FIG. 13 is an operational flowchart for explaining an example of an operation of a controlling section of the control apparatus according to the present invention.

DETAILED DESCRIPTION OF THE PREFERRED EMBODIMENT

Reference will hereinafter be made to the drawings in order to facilitate a better understanding of the present invention.

Figure 1:
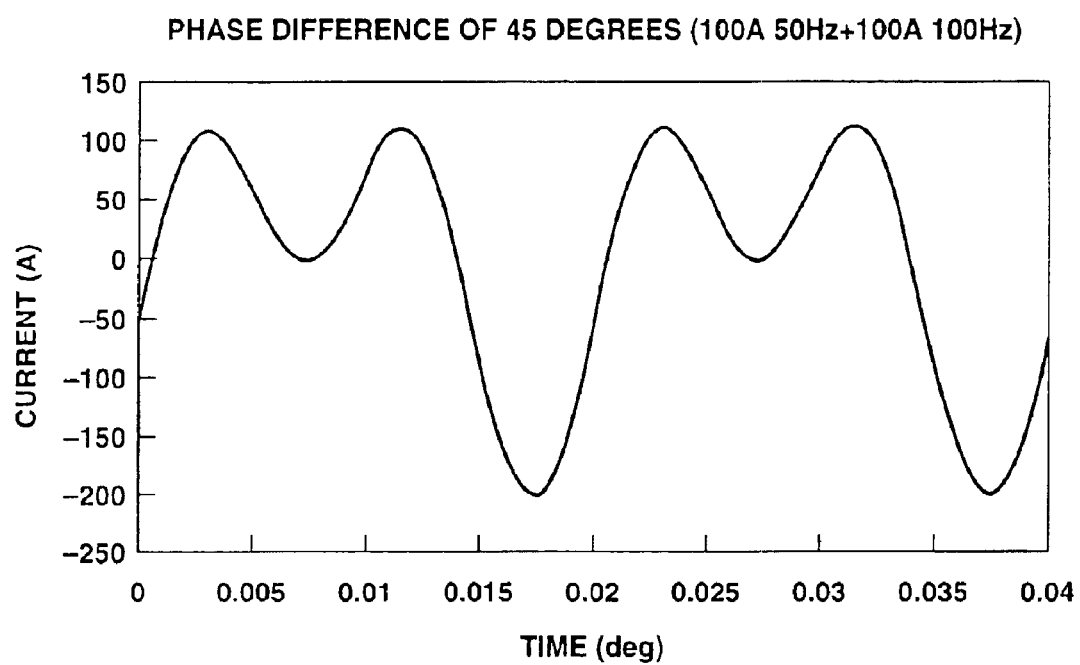
FIG. 1 is a characteristic graph representing a compound current waveform when a phase difference between compound current components for respective two rotors of at least one electrical rotating machine is 45 degrees.
Figure 2:
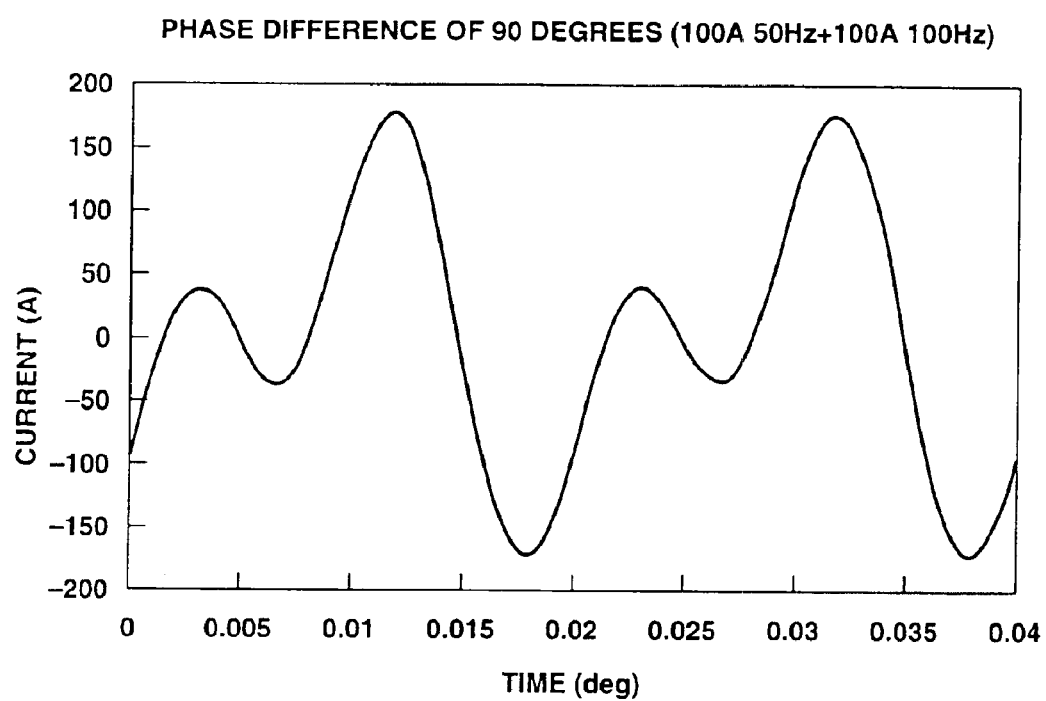
FIG. 2 is a characteristic graph representing a compound current waveform when a phase difference between compound current components for respective two rotors of at least one electrical rotating machine is 90 degrees.
Figure 3:
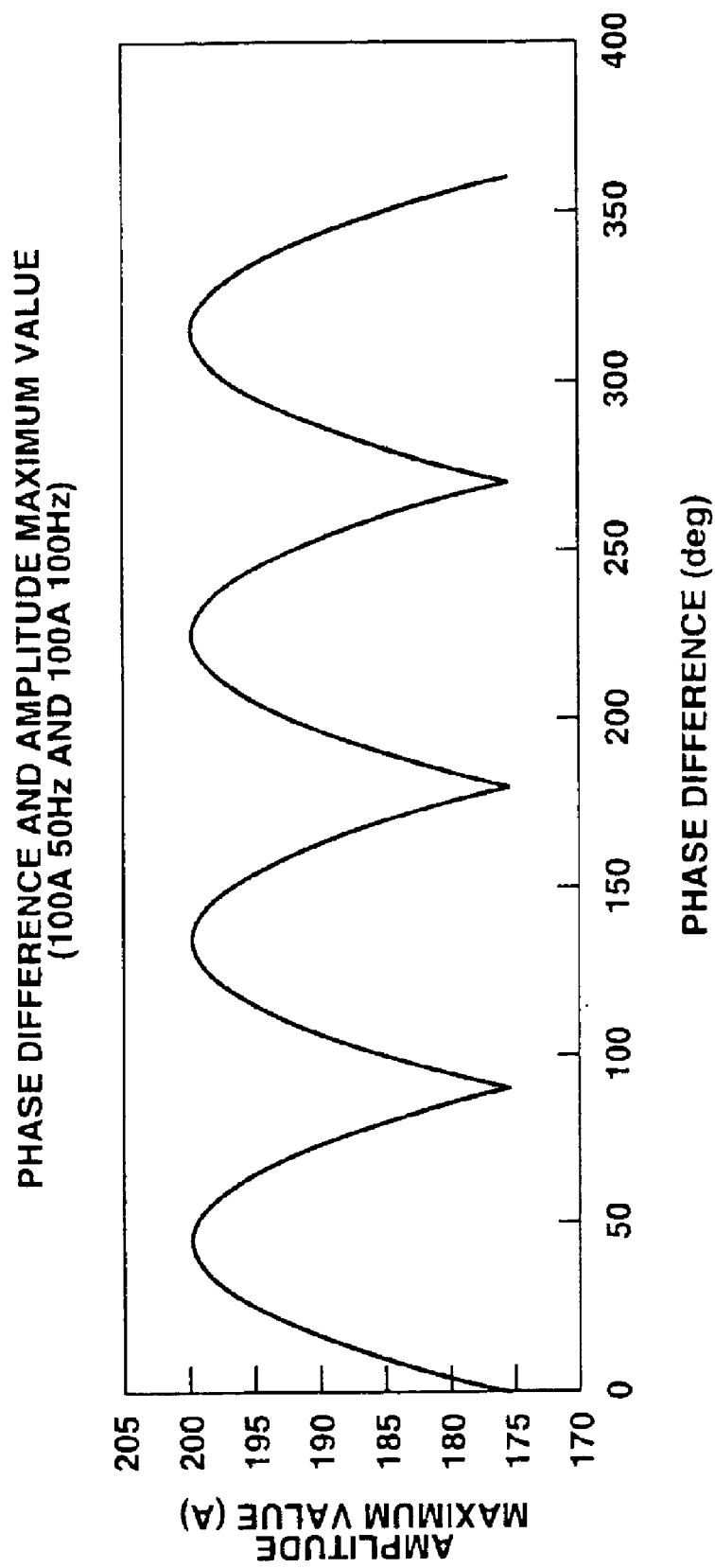
FIG. 3 is a graph representing a phase difference dependent characteristic of a current maximum value.
Figure 4:
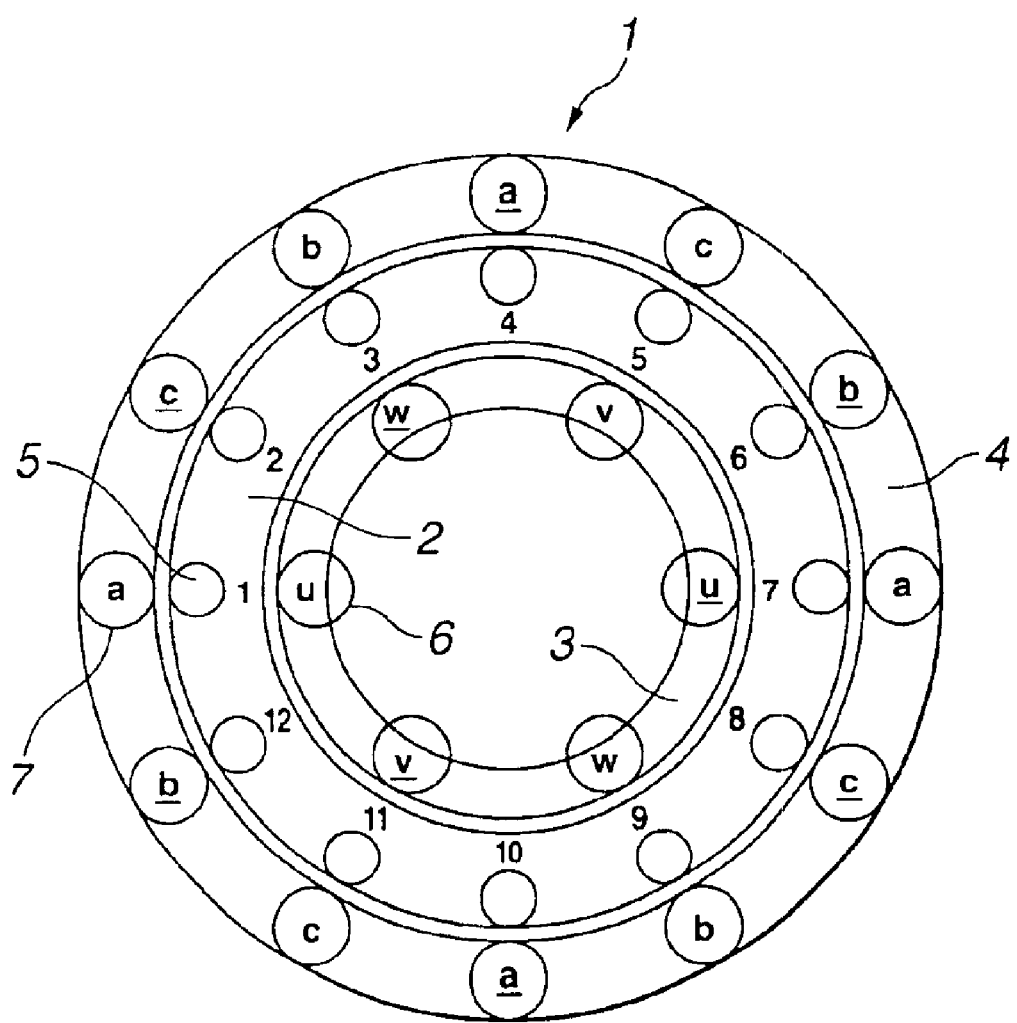
FIG. 4 is a cross sectional view of an electrical rotating machine to which a control apparatus according to the present invention is applicable.

First, FIG. 4 shows a cross sectional view of an electrical rotating machine main body 1 which is an object to be controlled of the control apparatus according to the present invention. It is noted that FIGS. 1, 2, and 3 have already been explained in the SUMMARY OF THE INVENTION.

As shown in FIG. 4, a hollow cylindrical stator 2 has an inner circumferential wall and an outer circumferential wall. An inner rotor 3 is arranged around the inner circumferential side of stator 2 with a predetermined gap therebetween. An outer rotor 4 is arranged around the outer periphery of stator 2 with a predetermined gap therebetween. (This is, often, called a three-layer structure). Inner and outer rotors 3 and 4 are disposed on the same axis of rotation so as to enable a rotation of an outer frame (not shown in FIG. 4). Since, in this case, inner and outer rotors 3, 4 are located at an inside of stator 2 and an outside thereof, it is necessary to arrange coils 5 along stator 2 in order to cause a current generating a rotating (magnetic) field to flow into coils 5 for each of inner and outer rotors 3, 4. An arrangement of twelve coils 5 shown in FIG. 4 is obtained as a result of consideration by referring to FIG. 5. First, rotating machine 1 shown in FIG. 5 will, at first, will be explained.

Figure 5:
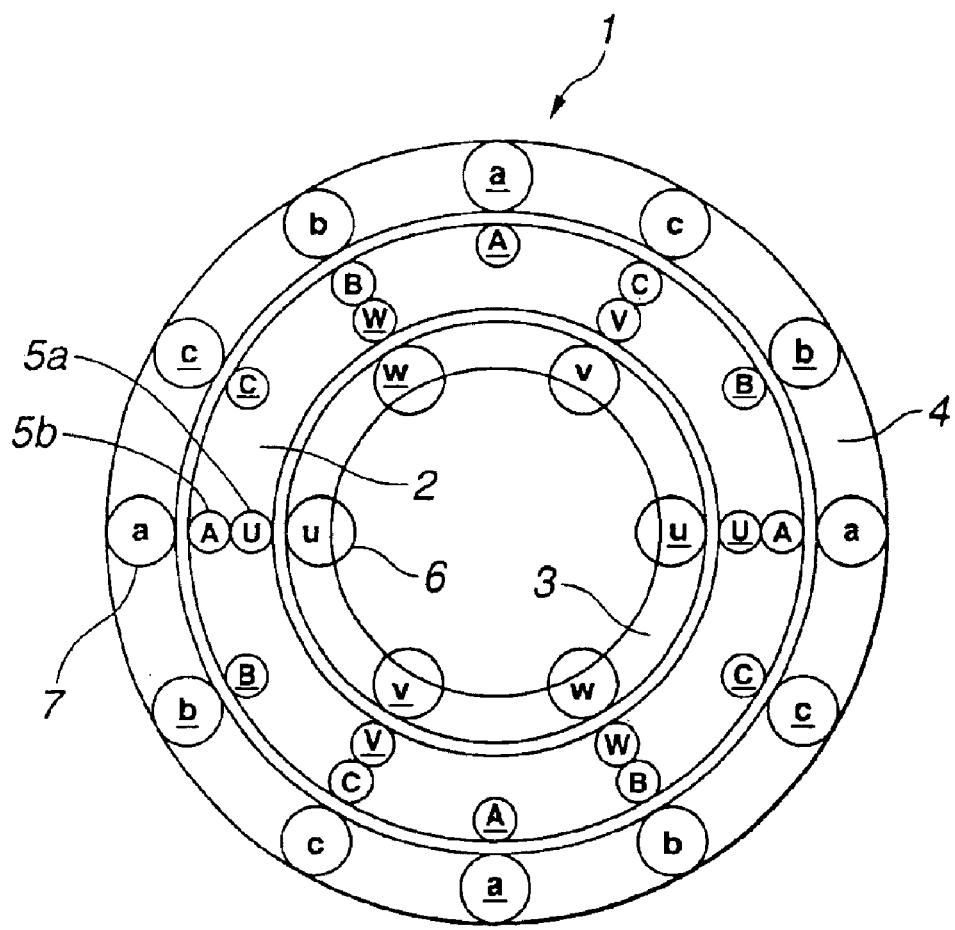
FIG. 5 is another cross sectional view of the electrical rotating machine to which a control apparatus according to the present invention is applicable.

Referring to FIG. 5, in order to cause the current (original current) to generate the rotating field for inner rotor 3 (three-phase alternating current), three couples of coils 5a (U phase, V phase, and W phase coils) are arranged at equal intervals to one another along the inner circumferential side of stator 2. Then, in order to cause the current to generate the rotating field for outer rotor 4 (three-phase alternating current), three couples of coils (A phase, B phase, and C phase coils) are arranged at equal intervals to one another along the outer circumferential side of stator 2. It is noted that a total number (twelve) of the outer circumferential side coils 5b of stator 2 is twice the total number (six) of the inner circumferential side coils 5a. Three couples of induction coils 6 and 7 are arranged on respective inner and outer rotors 3, 4 so as to oppose against each of inner and outer circumferential side coils 5a and 5b of stator 2. That is to say, an outer circumferential side of inner rotor 3 is provided with the same number of induction coils (six) as the inner circumferential side coils 5a of stator 2 (u phase, v phase, and w phase coils) at equal intervals to one another and an inner circumferential side of outer rotor 4 is provided with the same number (twelve) coils of induction coils (a phase, b phase, and c phase coils) as the outer circumferential side coil 5b are arranged at equal intervals to one another along the inner circumferential side of outer rotor 4. It is noted that, in order to facilitate the understanding of a corresponding relationship on each phase of the coils between the stator and rotors, lower case alphabets are assigned to induction coils 6, 7 of each rotor and upper case alphabets are assigned to stator coils 5a and 5b. It is noted that, in order to facilitate the understanding of a corresponding relationship on each phase of the coils between the stator and rotor, lower case alphabets are assigned to induction coils 6, 7 of each rotor and upper case alphabets are assigned to stator coils 5a and 5b. Each underline attached below the alphabets in FIGS. 4 and 5 means that the current is caused to flow in an opposite direction to the normal direction. For example, suppose that, if a current is caused to flow through two A phase coils spaced apart from each other by 180 degrees in a direction of a rear side of a sheet of paper as viewed from FIG. 5, the current is caused to flow through two A phase coils toward a direction of a front side of the sheet of paper (as viewed from FIG. 5).

In this way, when the three-phase alternating current is caused to flow with two stator coils 5a and 5b arranged as shown in FIG. 5, the current flowing through inner circumferential side coil 5a provides the rotating field (an inner rotating magnetic field) for induction coils 6 of inner rotor 3 and the current flowing through outer circumferential side coil 5b provides the rotating field (an outer rotating magnetic field) for induction coils 7 of outer rotor 4. At this time, a number of a pair of poles of inner rotor 3 is 1, a number of a pair of poles of outer rotor 4 is 2 so that an induction motor having a ratio of the number of pair of poles of two rotors 2:1 is structured. It is noted that, although, as one example, the induction motor has been described, the control apparatus according to the present invention is applicable to a sinusoidal wave driven motor, for example, a synchronous motor, an induction synchronous motor, and a permanent magnet synchronous motor.

It is noted that three couples of coils 5a (U, V, W), 5b (A, B, C) arranged on inner and outer circumferential sides of stator 2 are coils exclusively used for the respective inner and outer rotors 3 and 4 and it is necessary to provide two inverters that control the currents flowing into the respective exclusively used coils when the two exclusively used coils when the two exclusively used coils have been installed on stator 2. To cope with this double installations of the inverters, it is necessary to integrate two exclusively used coils when the two exclusively used coils have been installed on stator 2. In other words, to cope with this double installations of the inverters, it is necessary to integrate two exclusively used coils 5a and 5b into a single coil (common usable) as shown in FIG. 4. Since, in FIG. 5, two coils (A phase coil and U phase coil, B phase coil and W phase coil, C phase coil and V phase coil, A phase coil and U phase coil, and C phase coil and V phase coil), the compound currents $I_1$ through $I_{12}$ flowing through stator coil 5 shown in FIG. 4 when mutually compared with FIGS. 4 and 5 are expressed as follows:

$$I_1 = I_A + I_U$$
$$I_2 = I_C$$
$$I_3 = I_B + I_W$$
$$I_4 = I_A$$
$$I_5 = I_C + I_V$$
$$I_6 = I_B$$
$$I_7 = I_A + I_U$$
$$I_8 = I_C$$
$$I_9 = I_B + I_W$$
$$I_{10} = I_A$$
$$I_{11} = I_C + I_V$$
$$I_{12} = I_B \quad (1).$$

It is noted that, in equation (1), the underline attached below each phase current (for example, $I_C$) denotes the current whose flow direction is opposite to no underlined current.

In this case, suppose that, since a load of coils flowing through the respective compound currents of $I_1$, $I_3$, $I_5$, $I_7$, $I_9$, and $I_{11}$ are larger than the remaining coils through which the respective compound currents are caused to flow, the load is distributed to the remaining coils and the inner rotating field is formed together with the remaining coils.

For example, as contrasted FIG. 4 and FIG. 5, a portion of the stator coil 5 in FIG. 4 to which numerals 1 and 2 are assigned corresponds to A phase coil A and C phase coil C from among the outer circumferential coils 5b in FIG. 5 and U phase coil U from among the inner circumferential coils 5a in FIG. 5. In this case, suppose that the phase of U phase coil in FIG. 5 is slightly deviated in the clockwise direction of FIG. 5 and this slightly deviated phase coil is a new U' phase coil. At this time, a half of the current flowing through new U' phase coil is assigned to A phase coil A and C phase coil C in FIG. 5. The remaining portions of stator coil 5 shown in FIG. 4 are the similarly considered. Thus, another current setting can be achieved. That is to say, $$I_1 = I_A + (\tfrac{1}{2})I_{U'}$$
$$I_2 = I_C + (\tfrac{1}{2})I_{U'}$$
$$I_3 = I_B + (\tfrac{1}{2})I_{W'}$$
$$I_4 = I_A + (\tfrac{1}{2})I_{W'}$$
$$I_5 = I_C + (\tfrac{1}{2})I_{V'}$$
$$I_6 = I_B + (\tfrac{1}{2})I_{V'}$$
$$I_7 = I_A + (\tfrac{1}{2})I_{U'}$$
$$I_8 = I_C + (\tfrac{1}{2})I_{U'}$$
$$I_9 = I_B + (\tfrac{1}{2})I_{W'}$$
$$I_{10} = I_A + (\tfrac{1}{2})I_{W'}$$
$$I_{11} = I_C + (\tfrac{1}{2})I_{V'}$$
$$I_{12} = I_B + (\tfrac{1}{2})I_{V'} \quad (2).$$

Then, equation (2) may be replaced with an equation (3) described below:

$$I_1 = I_A + Ii$$
$$I_2 = I_C + Iii$$
$$I_3 = I_B + Iiii$$
$$I_4 = I_A + Iiv$$
$$I_5 = I_C + Iv$$
$$I_6 = I_B + Ivi$$
$$I_7 = I_A + Iviii$$
$$I_8 = I_C + Iviii$$
$$I_9 = I_B + Iix$$
$$I_{10} = I_A + Ix$$

$I_{11} = I_C + Ixi$ $I_{12} = I_B + Ixii$ (3).

In other words, current Ii through Ixii on each second term of a right side of equation (3) defines a twelve-phase current. This twelve-phase current can form the inner rotating field.

When the above-described current setting is carried out, two rotating fields of the inner and outer rotating fields are simultaneously generated although the coil 5 is the single coil structure as viewed from both rotors 3, 4. Induction coil 6 of inner rotor 3 does not receive the rotating force from the outer rotating field and, on the other hand, induction coil 7 of outer rotor 4 does not receive the rotating force from the inner rotating field.

Figure 6:
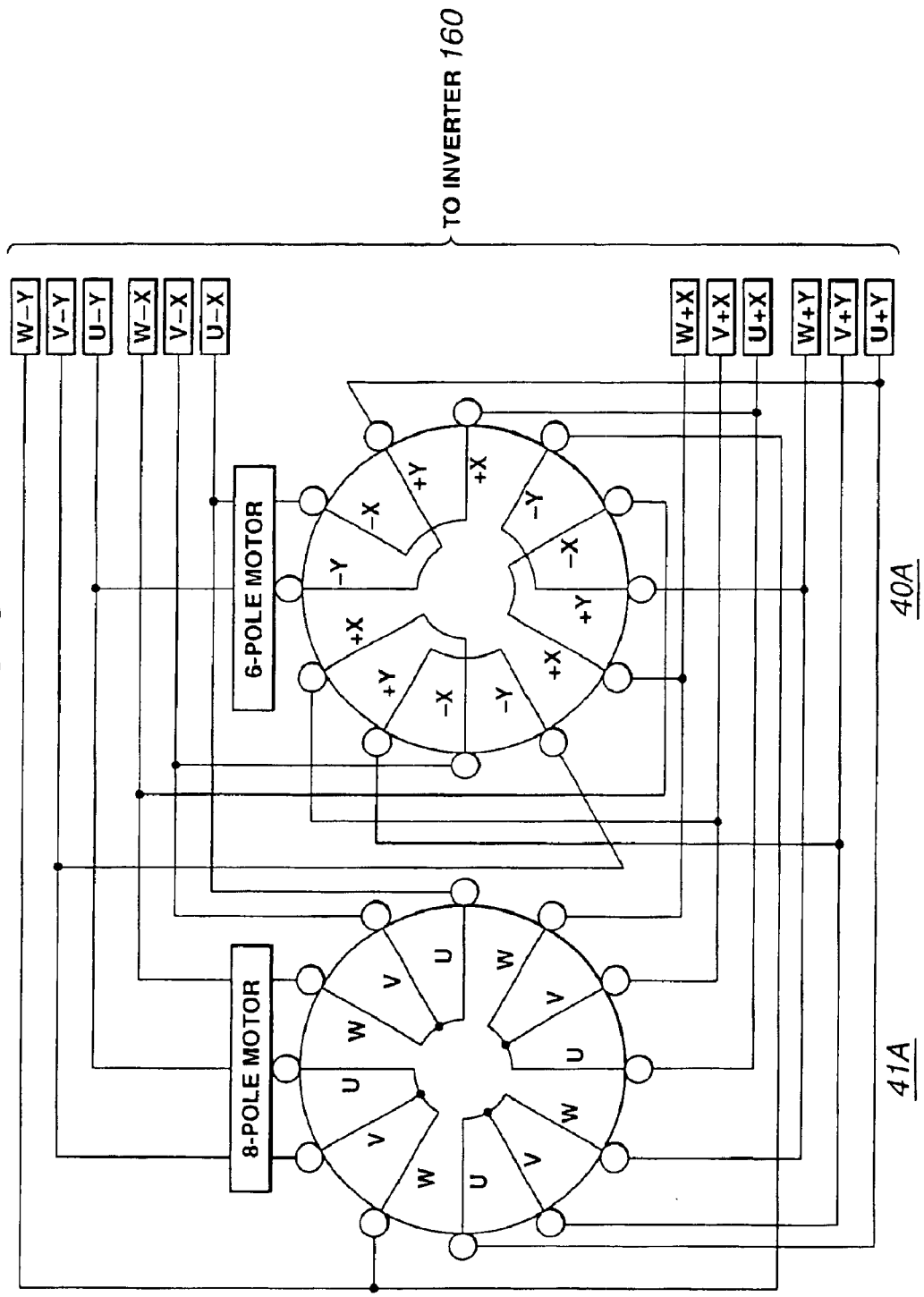
FIG. 6 is a cross sectional view of a pair of electrical rotating machines to which the control apparatus according to the present invention is applicable.

FIG. 6 shows a cross sectional view of an example of a pair of ordinary rotating machine main bodies (stator coil connection) 40A and 41A which are an object to be controlled by the control apparatus according to the present invention. In FIG. 6, electrical rotating machine main bodies (stators) 40A and 41A equipped together with the respective rotors can be controlled individually and separately by means of the compound current supplied from inverter 160. A principle of operation on a control method of the pair of ordinary electrical rotating machines is the same as the single electrical rotating machine 1 described above. It is noted that reference numerals 40A and 41A denotes right stator and left stator as will be described later with reference to FIGS. 14B and 14C and left stator 41A constitutes 8-pole motor (in a case of FIG. 6, 3-phase, four pole pairs) and right stator 40A (in a case of FIG. 6, 6-phase, two pole pairs) constitutes 6-pole motor. It is also noted that, in the case of the pair of rotating machines shown in FIG. 6, terminals denoted by W–Y, V–Y, U–Y, W–X, V–X, U–X, W+X, V+X, U+X, W+Y, V+Y, and U+Y are respectively connected to twelve inverter arms of inverter 160 shown in 7. The general explanations of the rotating machine and the pair of the rotating machines are herein ended.

Figure 7:
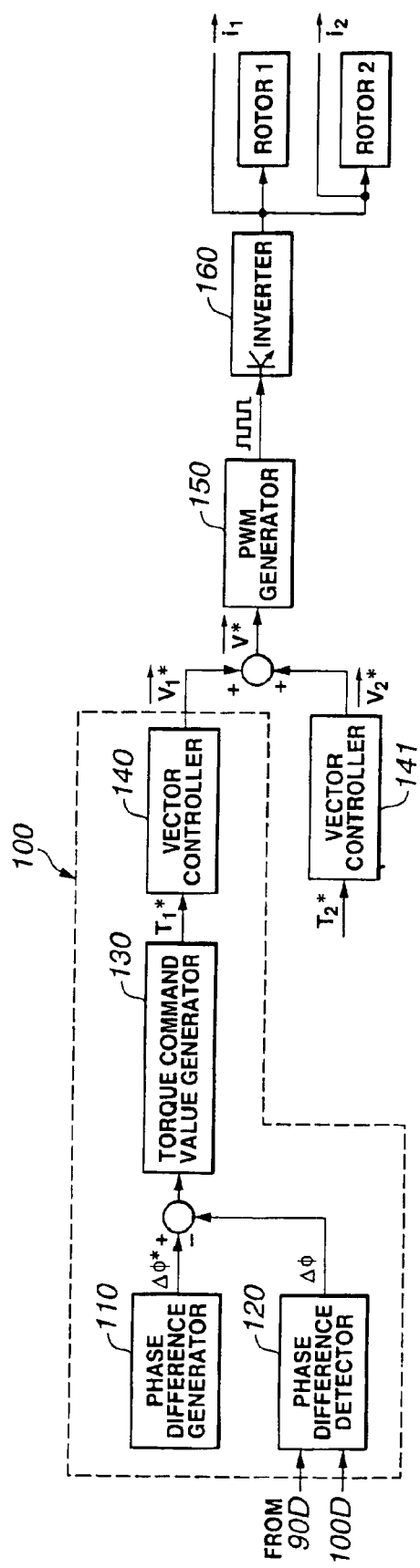
FIG. 7 is a functional block diagram of a basic structure of the control apparatus for at least one rotating machine according to the present invention.

Next, FIG. 7 shows a functional block diagram of a basic structure of the control apparatus for at least one electrical rotating machine according to the present invention.

A controlling section 100 in a preferred embodiment according to the present invention includes: a phase difference generator 110; a phase difference detector 120; a torque command value generator 130; and a vector controller 140. Phase difference generator 110 outputs a phase difference command value $\Delta\phi^*$. Phase difference detector 120 outputs an actual phase difference $\Delta\phi$ on the basis of phases detected from each position sensor constituted by, for example, a pulse encoder installed on the respective two rotors. Torque command value generator 130 receives a subtraction result of actual phase difference from the phase difference command value $\Delta\phi^*$ ($\Delta\phi^* - \Delta\phi$) and outputs a torque command value $T_1^*$ for one rotor on the basis of the subtraction result ($\Delta\phi^* - \Delta\phi$). Vector controller 140 outputs a vector $\vec{v}_1^*$ (a voltage command value) for the one rotor (for example, rotor 1) on the basis of torque command value $T_1^*$. It is noted that an output vector $\vec{v}_2^*$ for the other rotor (rotor 2) from another vector controller 141 is added to vector $\vec{v}_1^*$ and the added result, viz., ($\vec{v}_1^* + \vec{v}_2^*$) is applied to a PWM (Pulse Width Modulation) generator 150. PWM generator 150 outputs a PWM waveform (so called, drive pulse) to be supplied to each coil of stator 2 via an inverter 160 so that one rotor (1 or 2) is acted upon independently and separately by means of the compound current generated at inverter 160 from the other rotor to revolve the one rotor. It is noted that another torque command value denoted by $T_2^*$ is a torque value that a system demands and directly inputted to vector controller 141 since $T_2^*$ is a torque command to one (rotor 2) of the rotors which is the object to be a torque controlled.

It is also noted that, in FIG. 7, $\vec{i}_1$ denotes a current component (or original current) for one rotor (rotor 1) and $\vec{i}_2$ denotes a current component (or original current) for the other rotor (rotor 2) and $\vec{i}_1 + \vec{i}_2$ denotes the compound current described above.

Figure 8:
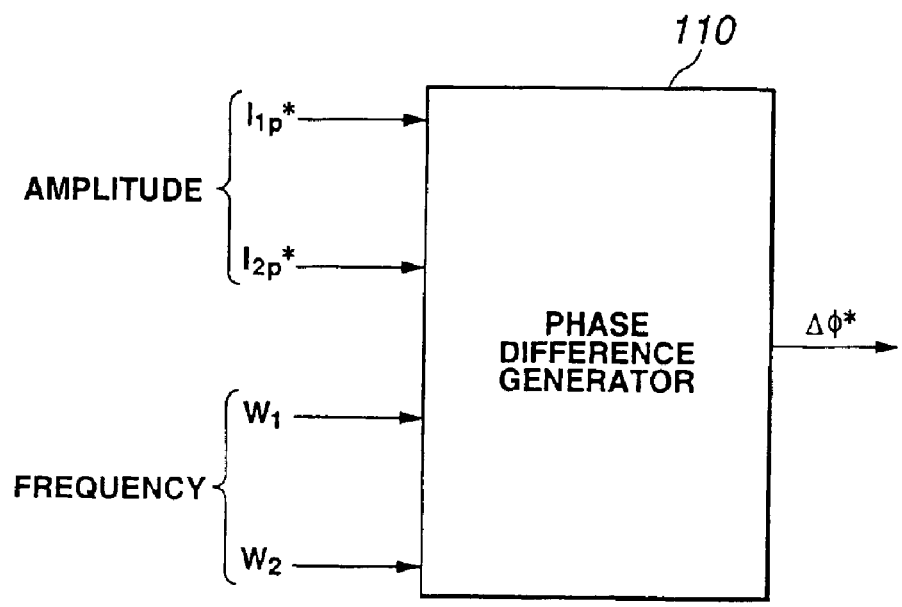
FIG. 8 is a functional block diagram of a phase difference generator shown in FIG. 7.

FIG. 8 shows a functional block diagram of phase difference generator 110 shown in FIG. 7. Phase difference generator 110 calculates phase difference command value $\Delta\phi^*$ from four outputs of amplitudes $I_1p^*$ of the current command value for one rotor (rotor 1) and $I_2p^*$ thereof for the other rotor (rotor 2) and frequencies $w_1$ and $w_2$ of the current command value for one rotor (rotor 1) and the other rotor (rotor 2) in an on-line mode (a real time basis). It is noted that $I_np^*$ (n=1, 2) can be determined from the following equation:

$$I_n p^* = \sqrt{i_{dn}^{*2} + i_{qn}^{*2}} / (\sqrt{pn_n}/2), \quad (4)$$

wherein pn denotes the number of phases and a subscript n denotes for rotor 1 or for rotor 2. It is noted that $i_{dn}^*$ and $i_{qn}^*$ (d-axis current for rotor n and q-axis current for rotor n) are determined using a predetermined two-dimensional map having a lateral axis of revolution speed (rpm) and a longitudinal axis of torque (N·m), as shown in FIG. 9B.

An example of calculating phase difference command value $\Delta\phi^*$ in the on-line mode will be described below. First, electrical angle one periods $T_1$ and $T_2$ for one rotor 1 and for the other rotor 2 are calculated by phase difference generator 110 from respective frequencies $w_1$ and $w_2$ in the current command values described above. Then, a least common multiple Ts of the one periods $T_1$ and $T_2$ is calculated by phase difference generator 110. Then, the following calculation is carried out by phase difference generator 110 using a pseudo time t up to a time corresponding to calculated least common multiple Ts. That is to say, assuming that $i_1$ (or $\vec{i}_1$)=$I_1$ (or $I_1p^*$)sin $\omega_1$(or $2\pi w_1$)t, $i_2$ (or $\vec{i}_2$)=$I_2$ (or $I_2p^*$) sin($\omega_2$(or $2\pi w_2$)t+$\psi$), a peak value Ip[$\psi$o] of $i_1+i_2$ is calculated from a time of t=0 to a time corresponding to t=Ts.

Next, assuming that $\psi=\psi$n (in this case, n=1, 2, 3, - - - , n), Ip[$\psi$n (n=1, 2, 3, - - - , k, - - - , n] is calculated by phase difference generator 110. From among the calculated values of Ip[$\psi$n (n=1, 2, 3, - - - , k, - - - , n], $\psi$k by which Ip[$\psi$k] takes a minimum value is outputted as phase difference command value $\Delta\psi^*$.

Figure 9A:
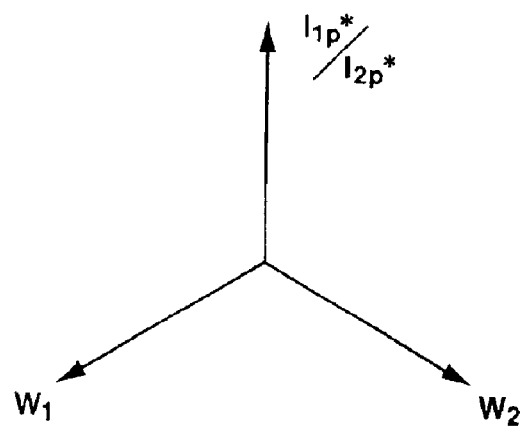
FIGS. 9A and 9B are map views for explaining a predetermined three-dimensional map used for detecting a phase difference and for explaining another predetermined two-dimensional map used for deriving d-axis and q-axis currents, respectively.
Figure 9B:
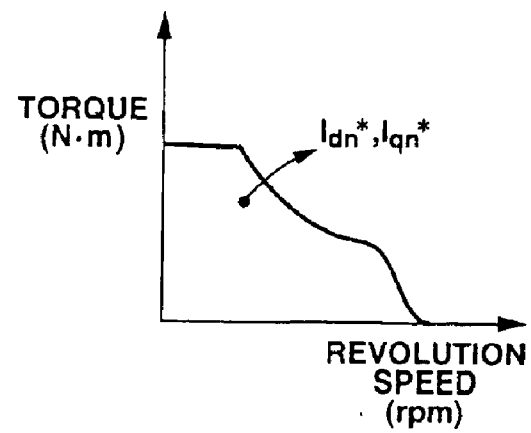

FIG. 9A shows a predetermined three-dimensional map for detecting the phase difference. As shown in FIG. 9A, with an amplitude ratio ($I_2p^*/I_1p^*$) and each frequency $w_1$ and $w_2$ of the compound current components (current command values) for inner and outer rotors (or one rotor 1 or other rotor 2) constituting three axes already prepared as a three-dimensional map, phase difference generator 110 may, alternatively, refer to this map of FIG. 9A to output a previously calculated phase difference command value $\Delta\phi^*$. It is noted that controlling section 100 does not carry out the control of the position of the one rotor (rotor 1 or rotor 2) if the value of the amplitude of the current command value for the one rotor divided by the amplitude of the current command value for the other rotor is larger than a predetermined maximum threshold value or if the value of the amplitude of the current command value for the one rotor divided by the amplitude of the current command value for the other rotor is smaller than a predetermined minimum threshold value.

Figure 10:
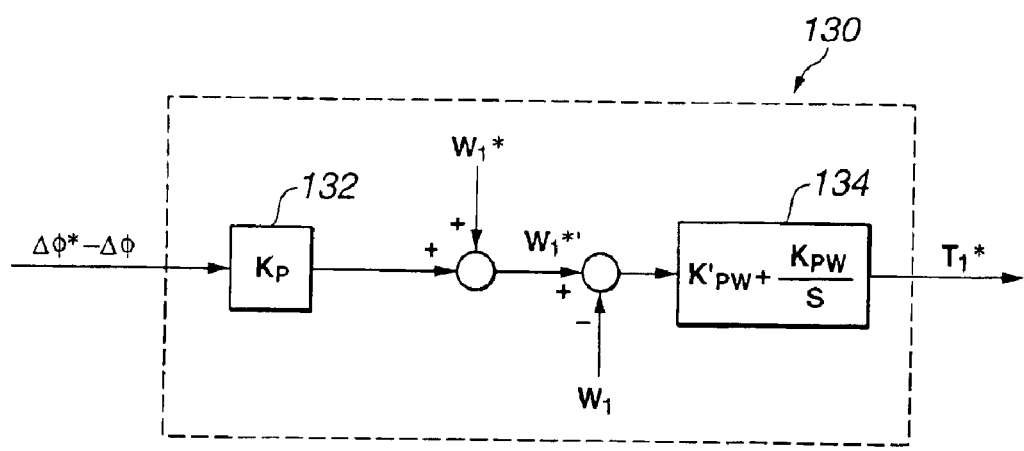
FIG. 10 is a detailed functional block diagram of a torque command value generator 130 shown in FIG. 7.

FIG. 10 shows a detailed functional block diagram of torque command value generator 130 in more details shown in FIG. 7. As shown in FIG. 10, the difference between phase difference command value $\Delta\phi^*$ and actual phase difference $\Delta\phi$ is provided by means of a proportional controller 132 having a transfer function Kp. An output of proportional controller 132 is added to a desired speed command value $w_1^*$ to provide a new speed command value $w_1^{*\prime}$. A deviation between the new speed command value $w_1^{*\prime}$ and actual speed $w_1$ ($w^*_1{}^\prime - w_1$) is determined. This deviation is supplied to a speed controller (proportional integrator) 134 having transfer functions of a proportional element K'pw and an integration element of Kpw/s (1/s denotes an integration operator) to provide torque command value $T_1^*$. When the phase control is started, the speed command value for one of the two rotors is increased (or decreased) until the actual phase difference reaches to an optimum phase difference (namely, the phase difference at which a level of the maximum value of the compound current becomes minimum). Then, as the actual phase difference $\Delta\phi$ approaches to an optimum phase difference (suppressed to be lowest), the speed command value is gradually returned to an original value. At this time, if $w_1^* = w_1$ (speed command value is made equal to actual speed), proportional controller 122 may be omitted and torque command generator 130 may be constituted only by speed controller 134.

Figure 11:
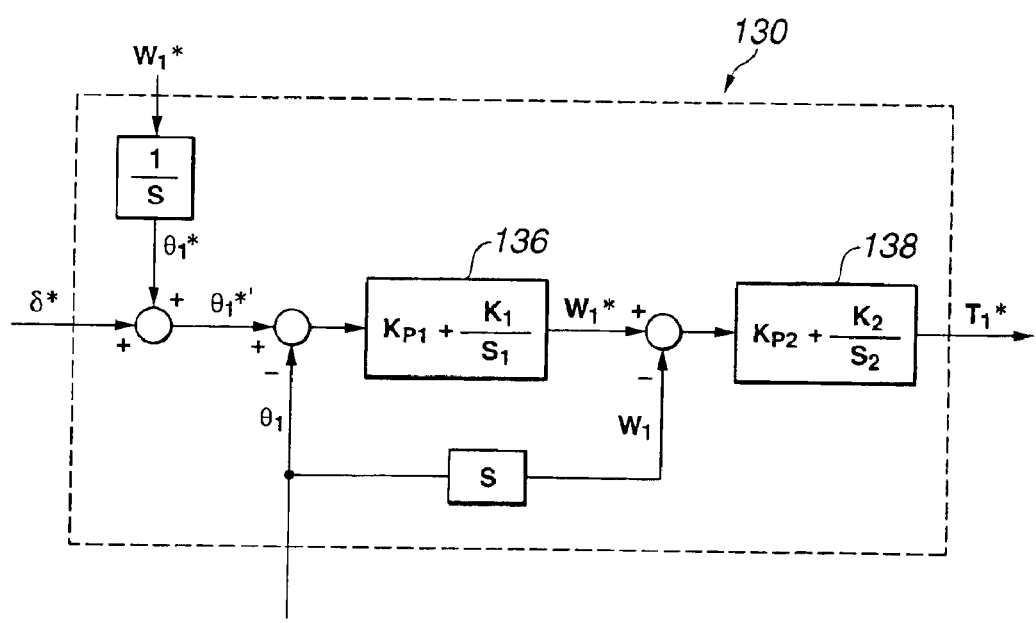
FIG. 11 is a functional block diagram of a variation of torque command generator 130 shown in FIG. 10.

FIG. 11 shows a functional block diagram representing a variation of torque command value generator 130 shown in FIG. 10. As shown in FIG. 11, a position command value ($\theta_1^*$) having no phase information is derived from speed command value $w_1^*$ by integrator 1/s. Phase command value $\delta^*$ is derived on the basis of outputs of phase difference detector 120 and phase difference generator 110 described above. Position command value $\theta_1^*$ is added to phase command value $\delta^*$ to provide a new phase command value $\theta_1^{*\prime}$. New phase command value $\theta_1^{*\prime}$ is subtracted from actual phase $\theta_1$, viz., the deviation of ($\theta_1^{*\prime} - \theta_1$) is supplied to speed controller 138. Position controller 136 and speed controller 138 are connected in series with each other to constitute a robust control system. Hence, a second-order control system having a high robustness (robust against an external disturbance) can be constructed.

FIGS. 12A and 12B show model views for explaining a principle of operation of phase difference detector 120. As shown in FIG. 12, on the basis of an encoder signal from an encoder 90D, 100D attached on each rotor (refer to FIG. 14A), the phase of the compound current component (original current) for each rotor is derived and phase difference $\Delta\phi$ is determined according to the following equation (5): $\Delta\phi = (\Delta T/T_1) \times 360$ degrees - - - (5), wherein $\Delta T$ denotes a time interval of the one encoder signal subsequently outputted from one the encoders 90D or 100D whose electrical angle one period is shorter than the other when the encoder signal for the other rotor whose electrical angle one period is longer falls as shown in FIGS. 12A and 12B.

FIG. 13 shows an example of an operational flowchart executed by controlling section 100 shown in FIG. 7 for at least one electrical rotating machine according to the present invention. At a step S1, controlling section 100 detects positions of each rotor 1 and 2 through the encoders 90D, 100D as described with reference to FIGS. 12A and 12B to detect phase difference $\Delta\phi$ between phases of the original currents constituting the compound current for the respective rotors on the basis of the detected rotor rotational positions. At a step S2, controlling section 100 generates phase difference command value $\Delta\phi^*$ which minimizes the compound current amplitude on the basis of the current command values one sampling time before the present sampling time for the respective rotors (rotor 1 and rotor 2). At a step S3, controlling section 100 compares generated phase difference command value $\Delta\phi^*$ and detected phase difference $\Delta\phi$ to generate the deviation of ($\Delta\phi^* - \Delta\phi$). At a step S4, torque command generator 130 of controlling section 100 receives the deviation and outputs torque command value $T_1^*$. At a step S5, controlling section 100 varies the position of the one of the rotors which is under the speed control from among the torque controlled rotor and the speed controlled rotor. At a step S6, controlling section 100 detects the phases of the respective rotors rotor 1 and rotor 2 in the same way as step S1. At a step S7, controlling section 100 compares phase difference command value $\Delta\phi^*$ with actual phase difference $\Delta\phi$ to determine whether there is the deviation. If $\Delta\phi^* = \Delta\phi$ (no deviation) at step S7, the routine is ended. If $\Delta\phi^* \neq \Delta\phi$ (No) at the step S7, the deviation is fed back to torque command generator 130 to the new torque command value $T_1^{*\prime}$. This steps of S4 through S7 are repeated until the deviation becomes zero.

Figure 14A:
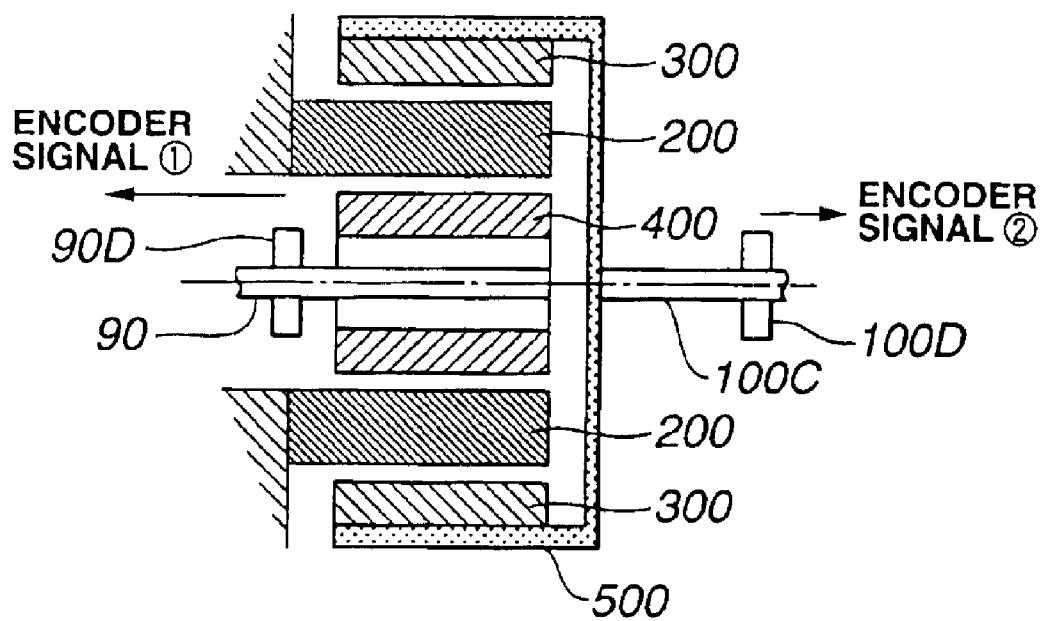
FIGS. 14A, 14B, and 14C are examples of the electrical rotating machine constituting a single compound motor to which the control apparatus according to the present invention is applicable and the pair of electrical rotating machines constituting two compound motors to which the control apparatus according to the present invention is applicable.
Figure 14B:
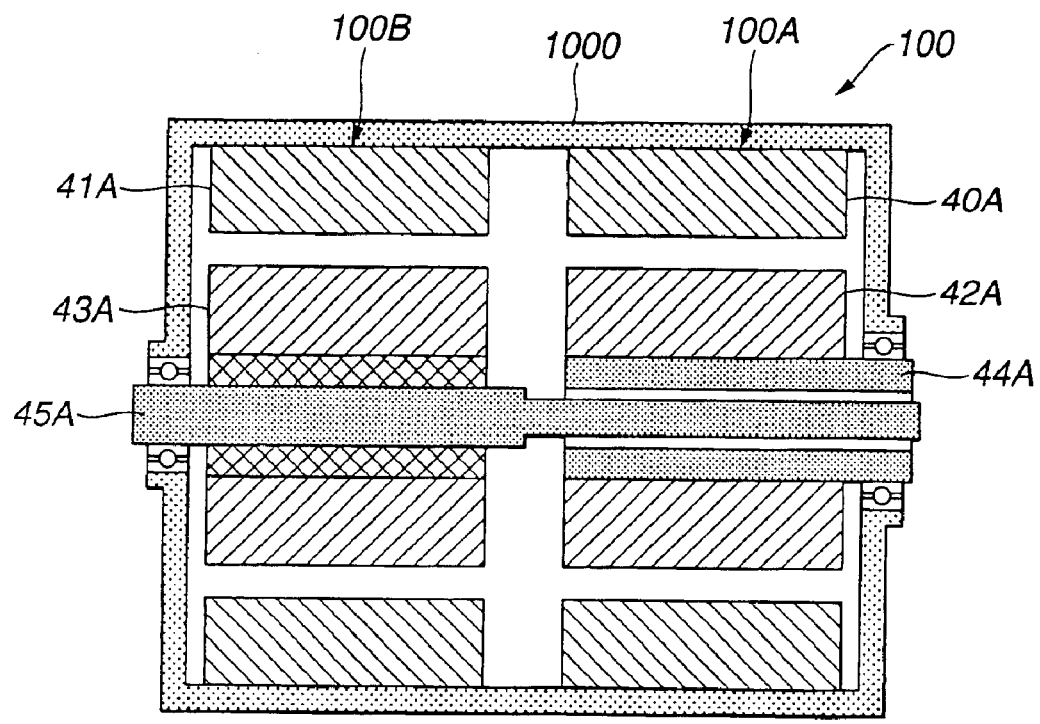
Figure 14C:
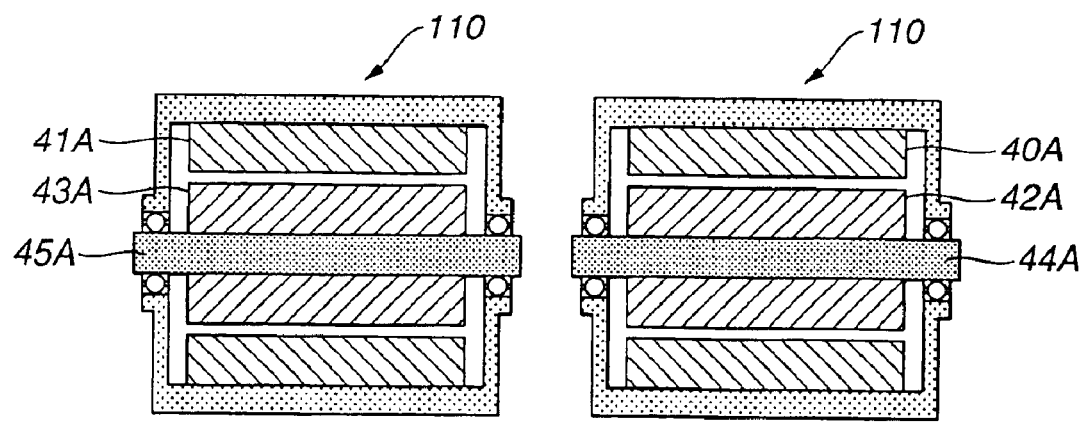

Various changes and-modifications can be made by those skilled in the art without departing from the scope of the present invention. For example, although, in the embodiment, rotors have induction coils, permanent magnets or electromagnets may be installed on the respective rotors of the rotating machine. Furthermore, the arrangements of rotors and stator may be modified. The present invention is applicable to such a rotating machine or rotating machines that the plurality of rotors are driven by means of the compound current. FIG. 14A is an example of the rotating machine having two rotors of inner rotor and outer rotor. In FIG. 14A, numeral 200 denotes the stator, numeral 300 denotes the outer rotor, numeral 400 denotes the inner rotor whose axle 90 is aligned to an axle 100C of outer rotor 300 connected via a housing 500. FIG. 14B shows an example of the pair of electrical machines. An integrated rotating machine (a compound motor) 110A shown in FIG. 14B includes: a left compound motor 100B having a left stator 41A, a left rotor 43A, and a coaxial axle 45A, a right compound motor 100A having right stator 40A, a right rotor 42A, and a large diameter coaxial axle 44A. FIG. 14C shows an example of the pair of electrical rotating machine. A left rotating machine 110 includes left stator 41A, left rotor 43A, and a left axle 45A. A right rotating machine 110 includes right stator 40A, right rotor 42A, and a right axle 44A. Left axle 45A is on the same rotational axis as right axle 44A. The details of the rotating machines shown in FIGS. 14A through 14C are described in a United States Patent Application Publication No. US2001/0020805 published on Sep. 13, 2001 (the disclosure of which is herein incorporated by reference). It is noted that rotor 1 shown in FIG. 7 may correspond to inner rotor 3 (400) or right rotor 42A and rotor 2 may correspond to outer rotor 4 (300) or left rotor 43A or vice versa.

The entire contents of a Japanese Patent Application No. 2002-098149 (filed in Japan on Apr. 1, 2002) are herein incorporated by reference. The scope of the invention is defined with reference to the following claims.

What is claimed is:

1. A control apparatus for an electrical rotating machine, comprising:
    a stator to arrange coils, the coils generating a rotating field by permitting a driving current to flow into the coils;
    two rotors disposed in the electrical rotating machine on the same axis of rotation and being driven by the rotating field and associated with the stator;

an inverter to supply driving currents to the coils, the inverter compounding the driving currents to drive the two rotors independently of each other by a compound current which is a sum of the driving currents for the respective rotors; and a controlling section that controls the driving currents to drive each of the rotors on the basis of desired speeds respectively, the controlling section controlling a phase difference between the respective driving currents for driving the respective rotors to suppress a maximum amplitude value of the compound current to a small value.

2. A control apparatus for an electrical rotating machine as claimed in claim 1, wherein the electrical rotating machine comprises a pair of electrical rotating machines, each electrical rotating machine being provided with a corresponding one of the two rotors, each rotor being independently driven by the compound current.

3. A control apparatus for an electrical rotating machine as claimed in claim 1, wherein the controlling section comprises: a phase difference generator that calculates a phase difference command value $\Delta\phi^*$ between phases of the driving currents of the compound current for the respective rotors to suppress the maximum amplitude value of the compound current to the small value; a phase difference detector that detects a phase difference $\Delta\phi$ between the phases of the driving currents for the respective rotors; a torque command value generator that generates a torque command value $T_1^*$ for one of the rotors on the basis of the phase difference command value $\Delta\phi^*$ and the detected phase difference $\Delta\phi$; and a vector controller that generates and outputs each current command value to be supplied to the stator for a corresponding one of the rotors on the basis of the generated torque command value $T_1^*$.

4. A control apparatus for an electrical rotating machine as claimed in claim 3, wherein the compound current is generated from the current command values for the rotors in such a manner as to be caused to flow through the stator for the respective rotors, each current command value including an amplitude $I_1p^*$, $I_2p^*$ and a frequency $w_1$, $w_2$, and the phase difference generator calculates the phase difference command value $\Delta\phi^*$ on a real time basis on the basis of respective amplitudes and frequencies included in the respective current command values.

5. A control apparatus for an electrical rotating machine as claimed in claim 3, wherein the compound current is generated from the current command values in such a manner as to be caused to flow through the stator for the respective rotors, each current command value including an amplitude $I_1p^*$, $I_2p^*$, and a frequency $w_1$, $w_2$, and the phase difference generator calculates the phase difference command value $\Delta\phi^*$ by referring to a predetermined map on the basis of the amplitudes and frequencies of the current command values.

6. A control apparatus for an electrical rotating machine as claimed in claim 3, wherein current command values generated by the vector controller are held for a constant interval of time and the phase difference generator calculates the phase difference command value $\Delta\phi^*$ on the basis of the respective amplitudes $I_1p^*$, $I_2p^*$ and frequencies $w_1$, $w_2$ included in the respective current command values.

7. A control apparatus for an electrical rotating machine as claimed in claim 5, wherein the predetermined map is a three-dimensional map having three axes constituting a value $(I_1p^*/I_2p^*)$ of the amplitude of the current command value for one of the respective rotors divided by the amplitude of the current command value for the other rotor and the respective frequencies $(w_1, w_2)$ of the current command values for the respective rotors.

8. A control apparatus for an electrical rotating machine as claimed in claim 7, wherein the controlling section halts a control of the chase difference when the value of the amplitude of the current command value for the one rotor divided by the amplitude of the current command value for the other rotor is larger than a predetermined maximum threshold value or when the value of the amplitude of the current command value for the one rotor divided by the amplitude of the current command value for the other rotor is smaller than a predetermined minimum threshold value.

9. A control apparatus for an electrical rotating machine as claimed in claim 4, wherein the phase difference generator calculates each electrical angle period $(T_1, T_2)$ of the current command values on the basis of the respective frequencies $(w_1, w_2)$ included in each current command value for the respective rotors, an internal time loop is constructed in such a manner that a unit time width of a pseudo time t is proportional to a least common multiple period Ts, calculates the maximum value of the compound current while varying the phase of the current command value for one of the respective rotors, and calculates the phase difference command value $\Delta\phi^*$ in such the manner that the calculated maximum value of the compound current becomes reduced.

10. A control apparatus for an electrical rotating machine as claimed in claim 3, wherein the phase difference detector detects the phase difference $\Delta\phi$ between the phases of the driving currents constituting the compound current for the respective rotors using an output signal from a position sensor disposed on each rotor on the basis of a falling edge of the output signal outputted at the next time to the output signal from one of the position sensors of the two rotors whose electrical angle frequency is lower than that from the other position sensor from among the falling edges of the output signals outputted for each electrical angle period from the respective position sensors.

11. A control apparatus for an electrical rotating machine as claimed in claim 3, wherein the torque command value generator generates the torque command value $T_1^*$ by deriving a difference between the phase difference command value $\Delta\phi^*$ outputted from the phase difference generator and the phase difference $\Delta\phi$ detected by the phase difference detector, by inputting the difference into a phase controller constituted by a proportional controller, an output of the phase controller being added to a speed command value $w_1^*$ to provide a speed command value $w_1^*$ in a case where an object to be controlled is a speed controlled rotor, and by inputting a difference between the speed command value and the frequency $(w_1)$ of the current command value to a speed controller.

12. A control apparatus for an electrical rotating machine as claimed in claim 3, wherein the torque command value generator generates the torque command value $T_1^*$ by outputting a phase command value $(\delta^*)$ of an object to be phase controlled on the basis of the phase difference command value outputted from the phase difference generator and the phase difference outputted from the phase difference detector, by inputting a position command value $(\theta_1^*)$ calculated from a special speed command value $(w_1^*)$ added to the phase command value to provide a new position command value $(\theta_1^{*\prime})$ to a position controller, and by inputting the new position command value outputted from the position controller into a speed controller.

13. A control apparatus for an electrical rotating machine as claimed in claim 3, wherein, in a case where one of the two rotors is a speed controlled rotor and the other rotor is a torque controlled rotor, the controlling section executes a position varying step at which the position of the speed controlled rotor is varied on the basis of the torque command value, detects the phase difference between the phases of the driving currents for the speed controlled rotor and the torque controlled rotor, executes a deviation generation step at which the detected phase difference is compared with the phase difference command value to generate a deviation therebetween, generates a new torque command value with the deviation therebetween fedback to the torque command generator to generate a new torque command value, executes the position varying step and the deviation generation step, and repeats the generation and execution until the deviation therebetween becomes zero.

14. A control method for an electrical rotating machine, the electrical rotating machine comprising: a stator to arrange coils, the coils generating a rotating field by permitting a driving current to flow into the coils; two rotors disposed in the electrical rotating machine on the same axis of rotation and being driven by the rotating field and associated with the stator; and an inverter to supply driving currents to the coils, the inverter compounding the driving currents to drive the two rotors independently of each other by a compound current which is a sum of the driving currents for the respective rotors, the control method comprising:

generating the compound current which is the sum of the driving currents for the respective rotors and is supplied to the stator which is common to the two rotors; and controlling the driving currents to drive each rotor on the basis of desired speeds respectively, the controlling the driving currents including controlling a phase difference between the respective driving currents for driving the respective rotors to suppress a maximum amplitude value of the compound current to a small value.

15. A control method for an electrical rotating machine as claimed in claim 14, wherein the electrical rotating machine comprises a pair of electrical rotating machines, each electrical rotating machine being provided with a corresponding one of the two rotors, each rotor being independently driven by means of the compound current.

16. A control method for an electrical rotating machine as claimed in claim 15, wherein controlling the phase difference between the respective driving currents comprises: calculating a phase difference command value $\Delta\psi^*$ between phases of the driving currents of the compound current for the respective rotors to reduce the maximum value of the compound current as low as possible; detecting a phase difference $\Delta\phi$ between the phases of the driving currents of the compound current for the respective rotors; generating a torque command value $T_1^*$ on the basis of the phase difference command value $\Delta\phi^*$ and the detected phase difference $\Delta\phi$; and generating and outputting each current command value to be supplied to the stator for a corresponding one of the rotors on the basis of the generated torque command value $T_1^*$.

17. A control method for an electrical rotating machine as claimed in claim 15, wherein the compound current is generated from the respective current command values in such a manner as to be caused to flow through the stator for each of the rotors, each current command value including an amplitude $I_1p^*$, $I_2p^*$ and a frequency $w_1$, $w_2$, and the phase difference command value $\Delta\phi^*$ is calculated on a real time basis on the basis of respective amplitudes and frequencies included in the respective current command values.

18. A control method for an electrical rotating machine as claimed in claim 15, wherein the compound current is generated from the current command values to be caused to flow through the stator for the respective rotors, each current command value including an amplitude $I_1p^*$, $I_2p^*$, and a frequency $w_1$, $w_2$, and the phase difference command value $\Delta\phi^*$ is calculated by referring to a predetermined map on the basis of the amplitudes and frequencies of the current command values.

19. A control apparatus for an electrical rotating machine, comprising:

stator means for arranging coils, the coils generating a rotating field by permitting driving currents to flow into the coils;

first and second rotor means disposed in the electrical rotating machine on the same axis of rotation and being driven by the rotating field and the stator means;

inverter means for supplying the driving currents to the coils, the inverter means compounding the driving currents to drive the first and second rotor means independently of each other by a compound current which is a sum of the driving currents for the respective rotor means; and controlling means for controlling the driving currents to drive the first and second rotor means on the basis of desired speeds respectively, the controlling means controlling a phase difference between the respective driving currents for driving the first and second rotor means to suppress a maximum amplitude value of the compound current to a small value.

* * * * *